United States Patent [19]
Hamada et al.

[11] Patent Number: 4,929,678
[45] Date of Patent: May 29, 1990

[54] RUBBER COMPOSITION AND A SOLID GOLF BALL OBTAINED THEREFROM

[75] Inventors: Akihiko Hamada, Kakogawa; Hidenori Hiraoka, Kobe; Yoshinobu Nakamura, Nishinomiya; Hiroshi Ohtsuru, Akashi, all of Japan

[73] Assignee: Sumitomo Rubber Industries, Ltd., Hyogo, Japan

[21] Appl. No.: 143,768

[22] Filed: Jan. 14, 1988

[30] Foreign Application Priority Data

May 2, 1987 [JP] Japan ................................ 62-109147

[51] Int. Cl.$^5$ ............................................... C08F 8/42
[52] U.S. Cl. .................................... 525/193; 525/236; 525/237; 525/274; 525/301
[58] Field of Search ............... 525/274, 301, 193, 236, 525/237

[56] References Cited

U.S. PATENT DOCUMENTS 4,056,269 11/1977 Pollitt et al. ......................... 525/274
4,305,851 12/1981 Tominaga et al. ................... 525/274
4,770,422 9/1988 Isaac ..................................... 525/274

OTHER PUBLICATIONS

"European H CIS", Aoyama and Partners, Technical Brochure.

Primary Examiner—Bernard Lipman
Attorney, Agent, or Firm—Birch, Stewart, Kolasch & Birch

[57] ABSTRACT

A rubber composition for a solid golf ball comprising a rubber component containing at least 40% by weight of a polybutadiene rubber which has a Mooney viscosity [$ML_{1+4}(100°\ C.)$] of 45 to 90 and a cis-1,4 bond of at least 80%, a co-crosslinking agent and a peroxide.

16 Claims, No Drawings

RUBBER COMPOSITION AND A SOLID GOLF BALL OBTAINED THEREFROM

FIELD OF THE INVENTION

The present invention relates to a rubber composition for a solid golf ball and a solid golf ball obtained therefrom.

BACKGROUND OF THE INVENTION

A solid golf ball is a golf ball excepting a thread wound golf ball in which thread rubbers are wound on a core and covered. The solid golf ball includes a one piece solid golf ball obtained by one piece molding and a usual solid golf ball consisting of a solid core and a resin cover. The usual solid golf ball generally includes a two piece solid golf ball of which solid core is obtained by one piece molding, and a multipiece solid golf ball of which solid core comprising a center core and one or more layers coated thereon. The solid golf ball at least contains a resilient portion obtained by vulcanizing a rubber composition.

The rubber composition for the solid golf ball contains a base rubber (such as polybutadiene rubber) and a co-crosslinking agent (such as a monomer having an unsaturated bond, for instance, a metal salt of an unsaturated carboxylic acid and the like). The co-crosslinking agent is grafted or crosslinked to the polybutadiene chain by the function of a peroxide polymerization initiator to form a three dimensional structure of the polybutadiene and the monomer. The three dimensional structure imparts a necessary hardness, rebound properties and durability to the obtained solid golf ball.

Although the obtained golf ball has tolerable properties, it is further required for a golf ball to have higher rebound coefficient and durability. Improvement of rebound coefficient and durability has been made by means of an amount of the co-crosslinking agent, an amount of the peroxide and a vulcanizing temperature and the like. However, no golf balls perfectly meeting these the requirements have been obtained yet.

For further improvement of rebound properties and durability, the inventors have studied in view of raw materials, especially the base rubber, i.e. polybutadiene. It has been found that a high cis-polybutadiene rubber having a Mooney viscosity of at least 45, preferably 50 to 70 enhances the rebound properties and durability of the solid golf ball as long as it has the same hardness. This cis-polybutadiene rubber has a higher molecular weight than a conventional high cis-polybutadiene rubber which has a Mooney viscosity of 35 to 45. On the other hand, when the high cis-polybutadiene has a high Mooney viscosity, it adversely affects workability in mixing, molding etc, so as to result in poor quality with regard to stability of golf balls. It is surprising that high cis-polybutadiene rubber having a high Mooney viscosity does not deteriorate workability and simultaneously accomplishes an improvement in physical properties, if the polybutadiene rubber has a dispersity (dispersity=- weight average molecular weight (Mw)/number average molecular weight (Mn)) of 4.0 to 8.0.

SUMMARY OF THE INVENTION

The present invention is to provide a rubber composition for a solid golf ball comprising a rubber component comprising at least 40% by weight of a polybutadiene rubber which has a Mooney viscosity [$ML_{1+4}(100°\ C.)$] of 45 to 90 preferably 50 to 70, and a cis-1,4 bond of at least 80%, a co-crosslinking agent, and a peroxide.

The present invention also provides solid golf balls formed from the rubber composition mentioned above.

DETAILED DESCRIPTION OF THE INVENTION

The polybutadiene rubber has a cis-1,4 bond content of at least 80%, preferably at least 95%. It also has a Mooney viscosity [$ML_{1+4}(100°\ C.)$] of 45 to 90, preferably 50 to 70, more preferably 55 to 65. A polybutadiene rubber having a Mooney viscosity of less than 45 is a conventional one and provides no improvement on the rebound properties and durability of the solid golf ball. If the polybutadiene has a Mooney viscosity of more than 90, dispersibility of the rubber composition becomes poor. In view of workability, it is preferred that the polybutadiene has a broad molecular weight distribution and a dispersity which is a ratio of weight average molecular weight (Mw)/number average molecular weight (Mn) within the range of 4.0 to 8.0, preferably 4.0 to 6.0. Dispersities of less than 4.0 deteriorate workability, and dispersities of more than 8.0 improve workability but decline the physical properties of the golf ball.

In addition to the polybutadiene, the rubber component (a) may contain the other rubber, for example, adiene type rubber, such as styrene-butadiene rubber, polyisoprene rubber, natural rubber and the like. An amount of the other rubber is less than 60% by weight, preferably less than 10% by weight based on the total weight of the rubber component (a).

In the present invention, the co-crosslinking agent (b) encompasses an unsaturated carboxylic acid and a metal salt thereof. Examples of the co-crosslinking agents are acrylic acid, methacrylic acid, a divalent metal salt thereof (such as zinc acrylate and zinc methacrylate), and a mixture thereof. The co-crossliking agent is present in the rubber composition of the present invention in an amount of 15 to 60 parts, preferably 25 to 40 parts by weight based on 100 parts by weight of the rubber component (a).

The peroxide (c) can be one which is generally used in this field. Representative examples of the peroxides are an organic peroxide, such as dicumyl peroxide, t-butylperoxybenzoate and di-t-butylperoxide; and the like. Dicumyl peroxide is preferred. The peroxide can be present in the rubber composition in an amount of 0.5 to 3.0 parts by weight, preferably 1.0 to 2.5 parts by weight based on 100 parts by weight of the rubber component.

A golf ball is standardized by JIS S-7005-1955 to a diameter of at least 42.67 mm for large size or at least 41.15 mm for small size, and a weight of not more than 5.9. A specific gravity of the golf ball is inevitably determined. In order to meet the standard, the rubber composition generally contains a filler, such as barium sulfate, zinc oxide, calcium carbonate, silica and the like. Also, an additive, such as antioxidant and the like may be added to the rubber composition to improve the properties of the golf ball.

The rubber composition of the present invention can be prepared by mixing the above components by means of a roll or a kneader. Mixing conditions are known to a skilled in the art. Generally, mixing is carried out for 10 to 30 minutes, preferably 15 to 25 minutes, at a temperature of 50° to 140° C., preferably 70° to 120° C.

The solid golf ball includes, as mentioned hereinbefore, a one piece solid golf ball, a two piece solid golf ball and a multipiece solid golf ball. The one piece solid golf ball can be prepared by vulcanizing the rubber composition of the present invention through one piece molding. The two and multi- piece solid golf ball is generally composed of a solid core and a resin cover. In case of the multipiece solid golf ball, the solid core is composed of a center core and one or more outer layers coated thereon. At least a portion of the solid core is prepared by vulcanizing the rubber composition of the present invention. Vulcanizing is conducted at a temperature of 140° to 170° C. for 20 to 40 minutes in a mold. The resin cover is one generally used for golf balls, preferably it is an ionomer resin which is available from Mitsui Polychemical Company under a trade name of Himilan 1707, 1706 and 1605. A combination of the ionomer resin can be employed. The ionomer resin can be blended with another resin.

The solid golf ball of the present invention has superior rebound properties and fatigue resistance in comparison with a golf ball employing a conventional butadiene rubber. Poor workability which is brought about from an elevated Mooney viscosity can be improved by adjusting the dispersity (Mw/Mn).

EXAMPLES

The present invention is illustrated by the following examples, which are not to be construed as limiting the invention to their details.

EXAMPLES 1 to 5 AND COMPARATIVE EXAMPLES 1 to 3

Physical and chemical properties of polybutadiene rubbers used in the Examples are listed in Table 1.

TABLE 1

| | Mooney viscosity[1] $ML_{1+4}$(100° C.) | Micro structure[2] (%) | | | Average Weight[3] Mn | molecular Mw | Dispersity Mw/Mn |
|---|---|---|---|---|---|---|---|
| | | Cis 1,4 | Trans 1,4 | Vinyl | | | |
| A | 55 | 96 | 2.5 | 1.5 | $12.5 \times 10^4$ | $75 \times 10^4$ | 6.0 |
| B | 60 | 96 | 2 | 2 | $15 \times 10^4$ | $75 \times 10^4$ | 5.0 |
| C | 55 | 95.5 | 3 | 1.5 | $13 \times 10^4$ | $74 \times 10^4$ | 5.7 |
| D | 62 | 96 | 2.5 | 1.5 | $18 \times 10^4$ | $68.5 \times 10^4$ | 3.8 |
| E | 43 | 96 | 2 | 2 | $9.8 \times 10^4$ | $47 \times 10^4$ | 4.8 |
| F | 40 | 96 | 2 | 2 | $9.7 \times 10^4$ | $44 \times 10^4$ | 4.5 |
| G | 42 | 96 | 2 | 2 | $9.0 \times 10^4$ | $76 \times 10^4$ | 8.5 |
| H | 75 | 96 | 2.5 | 1.5 | $21.0 \times 10^4$ | $85.1 \times 10^4$ | 4.1 |

A polybutadiene as shown in Table 1, zinc acrylate, zinc oxide and dicumyl peroxide were mixed using a roll in amounts shown in Table 2 and molded at 145° C. for 40 minutes to obtain a solid core having a diameter of 38.5 mm. The solid core was covered with a resin cover containing 100 parts by weight of an ionomer resin available from Mitsui Polychemical Company as Himilan 1707 and 2 parts by weight of titanium oxide to obtain a two piece large solid golf ball. The solid golf ball was subjected to a test on compression, coefficient of restitution and durability index and the result was shown in Table 2.

TABLE 2

| | | Examples | | | | | Comparative Example | | |
|---|---|---|---|---|---|---|---|---|---|
| | | 1 | 2 | 3 | 4 | 5 | 1 | 2 | 3 |
| Solid core ingredients (parts by weight) | Butadienerubber | | | | | | | | |
| | A | 100 | | | | | | | |
| | B | | 100 | | | | | | |
| | C | | | 100 | | | | | |
| | D | | | | 100 | | | | |
| | E | | | | | | 100 | | |
| | F | | | | | | | 100 | |
| | G | | | | | | | | 100 |
| | H | | | | | 100 | | | |
| | Zinc acrylate | 31 | 31 | 31 | 31 | 31 | 31 | 31 | 31 |
| | Zinc oxide | 22 | 22 | 22 | 22 | 22 | 22 | 22 | 22 |
| | Dicumyl peroxide | 2.0 | 2.0 | 2.0 | 2.0 | 2.0 | 2.0 | 2.0 | 2.0 |
| | Antioxidant[1] | 0.5 | 0.5 | 0.5 | 0.5 | 0.5 | 0.5 | 0.5 | 0.5 |
| Roll mixing properties[2] | | Good | Good | Good | Fairy good | Fairy good | Good | Good | Good |
| Ball properties | Compression[3] | 103 | 104 | 103 | 105 | 105 | 103 | 102 | 102 |
| | Coefficient of restitution[4] | 0.792 | 0.795 | 0.792 | 0.794 | 0.795 | 0.782 | 0.781 | 0.780 |
| | Durability index[5] | 120 | 130 | 120 | 125 | 125 | 100 | 100 | 97 |

EXAMPLES 6 to 10 AND COMPARATIVE EXAMPLES 4 to 6

Ingredients as shown in Table 3 were mixed using a roll in amounts shown in Table 3 and molded at 170° C. for 25 minutes to obtain a large, one piece solid golf ball. The solid golf ball was subjected to a test on compression, coefficient of restitution and durability index and the result was shown in Table 3.

TABLE 3

|  |  | Examples | | | | | Comparative Example | | |
|---|---|---|---|---|---|---|---|---|---|
|  |  | 6 | 7 | 8 | 9 | 10 | 4 | 5 | 6 |
| Solid core ingredients (parts by weight) | Butadienerubber A | 100 | | | | | | | |
|  | B | | 100 | | | | | | |
|  | C | | | 100 | | | | | |
|  | D | | | | 100 | | | | |
|  | E | | | | | | 100 | | |
|  | F | | | | | | | 100 | |
|  | G | | | | | | | | 100 |
|  | H | | | | | 100 | | | |
|  | Methacrylic Acid | 25 | 25 | 25 | 25 | 25 | 25 | 25 | 25 |
|  | Zinc oxide | 25 | 25 | 25 | 25 | 25 | 25 | 25 | 25 |
|  | Dicumyl peroxide | 1.0 | 1.0 | 1.0 | 1.0 | 1.0 | 1.0 | 1.0 | 1.0 |
| Roll mixing properties | | Good | Good | Good | Fairy good | Fairy good | Good | Fairy good | Good |
| Ball properties | Compression | 92 | 92 | 90 | 93 | 93 | 90 | 90 | 88 |
|  | Coefficient of restitution | 0.715 | 0.720 | 0.715 | 0.718 | 0.720 | 0.705 | 0.706 | 0.698 |
|  | Durability index | 118 | 125 | 118 | 123 | 123 | 100 | 100 | 95 |

What is claimed is:

1. A rubber composition for a solid golf ball having excellent durability and rebound properties comprising:
   (a) a rubber component comprising at least 40% by weight of a polybutadiene rubber which has a Mooney viscosity $\{ML_{1+4}(100°\ C.)\}$ of 50 to 70 and a cis-1,4 bond content of at least 80%,
   (b) a co-crosslinking agent, and
   (c) a peroxide.

2. The rubber composition according to claim 1 wherein the polybutadiene rubber has a dispersity of 4.0 to 8.0, wherein dispersity is the weight average molecular weight (Mw) divided by the number average molecular weight (Mn).

3. The rubber composition according to claim 1 wherein the rubber component is a mixture of said polybutadiene rubber and another diene type rubber.

4. The rubber composition according to claim 1 wherein the co-crosslinking agent is zinc acrylate.

5. The rubber composition according to claim 1 wherein the peroxide is dicumyl peroxide.

6. The rubber composition according to claim 2 wherein the rubber component is a mixture of said polybutadiene rubber and another diene type rubber.

7. The rubber composition according to claim 6, wherein the co-crosslinking agent is zinc acrylate.

8. The rubber composition according to claim 7 wherein the peroxide is dicumyl peroxide.

9. The rubber composition according to claim 1 wherein said polybutadiene rubber has a Mooney viscosity of 55 to 65.

10. The rubber composition according to claim 8 wherein said polybutadiene rubber has a Mooney viscosity of 55 to 65.

11. The rubber composition according to claim 1 wherein the polybutadiene rubber has a dispersity of 4.0 to 6.0.

12. The rubber composition according to claim 8 wherein the polybutadiene rubber has a dispersity of 4.0 to 6.0.

13. The rubber composition according to claim 10 wherein the polybutadiene rubber has a dispersity of 4.0 to 6.0.

14. The rubber composition according to claim 1 wherein said rubber component (a) comprises less than 60% by weight of a rubber other than the polybutadiene rubber, wherein said co-crosslinking agent (b) is present in an amount of 15 to 60 parts by weight based on 100 parts by weight of said rubber component (a), and wherein said peroxide (c) is present in an amount of 0.5 to 3.0 parts by weight based on 100 parts by weight of said rubber component (a).

15. The rubber composition according to claim 2 wherein said rubber component (a) comprises less than 10% by weight of a rubber other than the polybutadiene rubber, wherein said co-crosslinking agent (b) is present in an amount of 25 to 40 parts by weight based on 100 parts of said rubber component (a), and wherein said peroxide (c) is present in an amount of 1.0 to 2.5 parts by weight based on 100 parts by weight of said rubber component (a).

16. The rubber composition according to claim 8 wherein said polybutadiene rubber has a cis-1,4 bond content of at least 95%, wherein said rubber component (a) comprises less than 60% by weight of a rubber other than the polybutadiene rubber, wherein said co-crosslinking agent (b) is present in an amount of 15 to 60 parts by weight based on 100 parts by weight of said rubber component (a), and wherein said peroxide (c) is present in an amount of 0.5 to 3.0 parts by weight based on 100 parts by weight of said rubber component (a).

* * * * *

UNITED STATES PATENT AND TRADEMARK OFFICE
CERTIFICATE OF CORRECTION

PATENT NO. : 4,929,678
DATED : May 29, 1990
INVENTOR(S) : Akihiko HAMADA et al.

Page 1 of 2

It is certified that error appears in the above-indentified patent and that said Letters Patent is hereby corrected as shown below:

Inserting at column 4, line 56 below Table 2:

-- [1] Available from Yoshitomi Pharmaceutical Company as Yoshinox 425.

[2] Roll mixing properties: Total evaluation on roll winging conditions, dispersibility of the composition and surface conditions of a blank sheet.

Good: No problems on the above check points.

Fairly good: No problem on dispersibility of the composition, but winding conditions are bad and surface conditions are very rough.

Bad: Every check point is bad.

[3] Compression according to PGA expression.

[4] Calculated from an initial velocity when a metal cylinder of 198.4 g was collided with a ball at 45 m/s at 23 °C.

UNITED STATES PATENT AND TRADEMARK OFFICE
CERTIFICATE OF CORRECTION

PATENT NO. : 4,929,678
DATED : May 29, 1990
INVENTOR(S) : Akihiko HAMADA et al.

It is certified that error appears in the above-indentified patent and that said Letters Patent is hereby corrected as shown below:

5    An index of number of collisions until a ball is broken when it is repeatedly collided with an impact board at 45 m/s, which is calculated by converting Comparative Example 1 to 100.--.

Signed and Sealed this

Twenty-ninth Day of July, 1997

*Attest:*

BRUCE LEHMAN

*Attesting Officer*     *Commissioner of Patents and Trademarks*